(12) United States Patent
Matsuhira (10) Patent No.: US 8,654,403 B2
(45) Date of Patent: Feb. 18, 2014

(54) IMAGE PROCESSING APPARATUS AND PROGRAM THEREFOR

(75) Inventor: Masatoshi Matsuhira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 474 days.

(21) Appl. No.: 13/087,971

(22) Filed: Apr. 15, 2011

(65) Prior Publication Data

US 2011/0255104 A1  Oct. 20, 2011

(30) Foreign Application Priority Data

Apr. 15, 2010  (JP) ................................. 2010-093757

(51) Int. Cl.
  *H04N 1/40* (2006.01)
(52) U.S. Cl.
  USPC .......................................... 358/3.23; 345/27
(58) Field of Classification Search
  None
  See application file for complete search history.

(56) References Cited

U.S. PATENT DOCUMENTS

2004/0165081 A1  8/2004  Shibaki et al.

FOREIGN PATENT DOCUMENTS

| JP | 5-48892 A | 2/1993 |
|---|---|---|
| JP | 3153221 A | 1/2001 |
| JP | 2004-187119 A | 7/2004 |
| JP | 2009-21915 A | 1/2009 |

*Primary Examiner* — Twyler Haskins
*Assistant Examiner* — Christopher D Wait
(74) *Attorney, Agent, or Firm* — Nutter McClennen & Fish LLP; John J. Penny, Jr.

(57) ABSTRACT

An advantage of the invention is to provide an image processing apparatus and a medium therefor, which enable shortening of processing time necessary for performing the whole color conversion in the case where only one of LUTs used for the color conversion can be stored in a storage means having a high access rate. In the image processing apparatus, for image data including a plurality of pixels and being a target for a color conversion, when performing the color conversion of the image data, a value of a counter for pictures, which indicates a predicted total number of references to an LUT for pictures, and a value of a counter for texts, which indicates a predicted total number of references to an LUT for texts, are derived.

7 Claims, 6 Drawing Sheets

IMAGE PROCESSING APPARATUS AND PROGRAM THEREFOR

BACKGROUND

1. Technical Field

The present invention relates to an image processing apparatus and a medium therefor.

2. Related Art

To date, an image processing apparatus, in which, in a high-speed mode, a look-up table (LUT) used for a color conversion, which is obtained after decreasing a total number of grids therefor, is stored in a storage means having a small storage capacity and a high access rate; whilst, in a high-resolution mode, the LUT, which is obtained after increasing a total number of grids therefor, is stored in a storage means having a large storage capacity and a low access rate, has been proposed (for example, refer to JP-A-2009-21915).

In the image processing apparatus described in JP-A-2009-21915, the number of the LUTs used for a set of image data is constantly only one. However, it can be conceived that, for a set of image data, a color conversion is performed by using one of LUTs, which differs in accordance with attributes of pixels included in the set of image data. Such a case is not taken into account in JP-A-2009-21915. Meanwhile, a storage means having a high access rate is so high in cost that the storage means is likely to have only a relatively small storage capacity. Therefore, even though it is attempted to shorten processing time necessary for performing a color conversion by storing a plurality of LUTs in a storage means having a high access rate, sometimes, a shortage of the storage capacity thereof occurs.

SUMMARY

An advantage of the invention is to provide an image processing apparatus and a medium therefor, which enable shortening of processing time necessary for the whole color conversion in the case where only one of LUTs, which are used for the color conversion, can be stored in a storage means having a high access rate.

In an image processing apparatus according to the invention, in order to achieve the above-described advantage, the following sections are provided.

An image processing apparatus according to aspects of the invention includes a first storage section configured to, as look-up tables (LUTs) for being referenced when performing a color conversion from a first color space to a second color space, store an LUT for pictures, which is appropriate to performing the color conversion of a picture pixel that is a pixel included in an area representing a picture, and an LUT for texts, which is appropriate to performing the color conversion of a text pixel that is a pixel included in an area representing a text; a second storage section configured to have a storage capacity that is larger than each of a storage size of the LUT for pictures and a storage size of the LUT for texts, and further, is smaller than a storage size resulting from summing the storage size of the LUT for pictures and the storage size of the LUT for texts, and have an access rate higher than an access rate of the first storage section; a total-number-of-references prediction section configured to, for image data including a plurality of pixels and being a target for the color conversion, derive a predicted total number of references to the LUT for pictures and a predicted total number of references to the LUT for texts when performing the color conversion of the image data; an LUT-to-be-stored determination section configured to determine the LUT for pictures or the LUT for texts, whichever has a larger one of the predicted total numbers of references, as an LUT to be stored in the second storage section; and a storage section configured to, from the first storage section, read out the LUT, that is, either of the LUT for pictures or the LUT for texts, which has been determined by the LUT-to-be-stored determination section, from the first storage section, and store the read-out LUT in the second storage section.

In this image processing apparatus, a first storage section, which is configured to, as look-up tables (LUTs) for being referenced when performing a color conversion from a first color space to a second color space, store therein an LUT for pictures, which is appropriate to performing the color conversion of a picture pixel that is a pixel included in an area representing a picture, and an LUT for texts, which is appropriate to performing the color conversion of a text pixel that is a pixel included in an area representing a text. Further, in this image processing apparatus, a second storage section, which is configured to have a storage capacity that is larger than each of a storage size of the LUT for pictures and a storage size of the LUT for texts, and further, is smaller than a storage size resulting from summing the storage size of the LUT for pictures and the storage size of the LUT for texts, and have an access rate higher than an access rate of the first storage section, is included. Further, this image processing apparatus is configured to, for image data including a plurality of pixels and being a target for the color conversion, derive a predicted total number of references to the LUT for pictures and a predicted total number of references to the LUT for texts when performing the color conversion of the image data, and determine the LUT for pictures or the LUT for texts, whichever has a larger one of the predicted total numbers of references, as an LUT to be stored in the second storage section. Further, this image processing apparatus is configured to, afterwards, read out the LUT, that is, either of the LUT for pictures or the LUT for texts, which has been determined to be stored in the second storage section, from the first storage section, and store the read-out LUT in the second storage section. In such a manner, the LUT for pictures or the LUT for texts, whichever has a larger one of the predicted total numbers of references, is stored in the second storage section, which has an access rate higher than an access rate of the first storage section. Accordingly, in the case where only one of the LUTs that are used for the color conversion can be stored in the second storage section having an access rate higher than an access rate of the first storage section, by appropriately determining which of the LUTs is to be stored in the second storage section, it is possible to shorten processing time necessary for performing the whole color conversion.

In the image processing apparatus, according to aspects of the invention, the total-number-of-references prediction section may be a section configured to, for each of the pixels included in the image data, determine to which pixel kind of the picture pixel or the text pixel the pixel belongs, derive a predicted total number of references to the LUT for pictures on the basis of a total number of picture pixels, that is, a total number of pixels each having been determined to be the picture pixel, and further, derive a predicted total number of references to the LUT for texts on the basis of a total number of text pixels, that is, a total number of pixels each having been determined to be the text pixel. In such a manner, it is possible to appropriately derive the predicted total number of references to the LUT for pictures and the predicted total number of references to the LUT for texts. In this case, the total-number-of-references prediction section may be a section configured to sequentially assign each of the pixels as a noticed pixel in the same order as an order of the color conversion of each of the pixels performed when the color conversion of the image data is performed, determine that the noticed pixel is a successive pixel if the noticed pixel and a pixel immediately prior to the noticed pixel belong to the same kind of pixels, and further, represent the same color, derive a first value as a predicted total number of references to the LUT for pictures, the first value being obtained by subtracting a total number of the successive pixels associated with pixels that have been determined to be the picture pixels from the total number of picture pixels, and derive a second value as a predicted total number of references to the LUT for texts, the second value being obtained by subtracting a total number of the successive pixels associated with pixels that have been determined to be the text pixels from the total number of text pixels. When sequentially performing the color conversion of each of the pixels, if a noticed pixel and a pixel immediately prior to the noticed pixel belong to the same kind of pixels, and further, have the same color, since a result of a color conversion of the pixel immediately prior to the noticed pixel, having been performed with reference to either of the LUT for pictures or the LUT for texts, can be applied to a color conversion of the noticed pixel, it is unlikely to reference the LUT once again. Therefore, by taking account a total number of such pixels (i.e., successive pixels) associated with each of the picture pixel and the text pixel, it is possible to appropriately derive each of the predicted total number of references to the LUT for pictures and the predicted total number of references to the LUT for texts.

In the image processing apparatus according to aspects of the invention, a third storage section, which is configured to have a storage capacity that is larger than each of a storage size of the LUT for pictures and a storage size of the LUT for texts, and have an access rate that is higher than an access rate of the first storage section, and further, is lower than an access rate of the second storage section, may be further included, and the storage section may be a section configured to, from the first storage section, read out one LUT of the LUT for pictures and the LUT for texts, which has been determined by the LUT-to-be-stored determination section, to store the one LUT in the second storage section, and further, from the first storage section, read out the other LUT of the LUT for pictures and the LUT for texts to store the other LUT in the third storage section. In such a manner, one of the LUTs, which is not stored in the second storage section, is also stored in the third storage section having an access rate higher than an access rate of the first storage section, and thus, it is possible to shorten the whole processing time necessary for performing a color conversion of image data.

In the image processing apparatus according to aspects of the invention, the storage section may be a section configured to, when the LUT-to-be-stored determination section determines that the LUT for texts is to be stored in the second storage section, store the LUT for pictures obtained after increasing a total number of grids of the LUT for pictures having been read out from the first storage section so that a storage size of the LUT for pictures to be stored can be within a range not exceeding a size of a space area of the third storage section. In such a manner, a total number of grids of the LUT for pictures is increased when storing the LUT for pictures in the third storage section, and thus, it is possible to perform a color conversion of the picture pixels with high quality. In this case, the LUT-to-be-stored determination section may be a section configured to, in stead of determining the LUT for pictures or the LUT for texts, whichever has a larger one of the total numbers of references, as an LUT to be stored in the second storage section, determine the LUT for texts as an LUT to be stored in the second storage section if a difference between the predicted total number of references to the LUT for pictures and the predicted total number of references to the LUT for texts is within a range between predetermined threshold values, which allows both thereof to be considered to be nearly equal to each other, and determine the LUT for pictures or the LUT for texts, whichever has a larger one of the total numbers of references, as an LUT to be stored in the second storage section if the difference therebetween is not within the range between the predetermined values. In the case where the predicted total number of references to the LUT for pictures and the predicted total number of references to the LUT for texts are nearly equal to each other, no matter which of the LUTs is stored in the second storage section, a processing rate of the image processing apparatus is not affected so much. Therefore, in such a case, by storing the LUT for texts in the second storage section, and storing the LUT for pictures obtained after increasing the number of grids therefor in the third storage section, it is possible to shorten processing time necessary for performing the whole color conversion, and further, perform a color conversion of picture pixels with high quality in as many cases as possible.

A program according to aspects of the invention is a program for causing a computer to function as either of the above-described image processing apparatuses. This program may be stored in a computer-readable recording medium (for example, a hard disc, a ROM, an FD, a CD, a DVD or the like), may be delivered from a computer to a different computer, those being connected to each other via a transmission medium (i.e., a communication network, such as the Internet or LAN), or may be transferred in any other ways. Once a computer is caused to execute this program, the computer functions as the above-described image processing apparatus according to any of aspects of the invention, and thus, it is possible to obtain operation effects the same as those of the image processing apparatus according to aspects of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
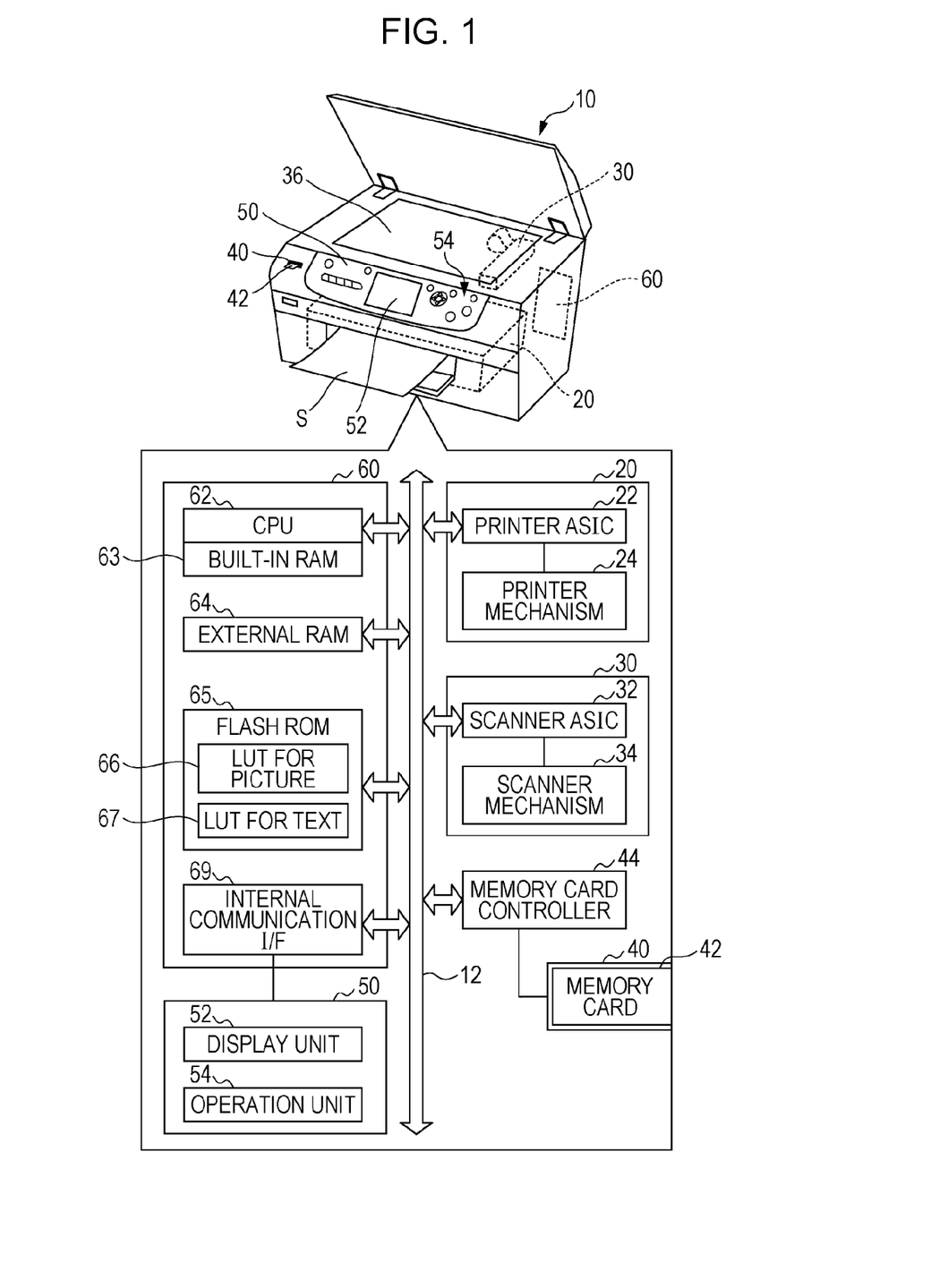
FIG. 1 is a block diagram illustrating an outline of a configuration of a printer according to an embodiment of the invention.

Next, an embodiment of the invention will be hereinafter described with reference to drawings. FIG. 1 is a block diagram illustrating an outline of a configuration of a printer 10, which is an embodiment of an image processing apparatus according to aspects of the invention. The printer 10 according to this embodiment is configured as a multi-function printer including a printing function, a scanning function and a copying function. This printer 10 is configured to, as shown in FIG. 1, include a printer unit 20 for perform printing on a sheet of printing paper S on the basis of image data, a scanner unit 30 for reading in the content of a document placed on a glass table 36, a memory card controller 44 for outputting/inputting files including data stored therein to/from a memory card 42 being inserted in a memory card slot 40, an operation panel 50 for displaying various pieces of information on a display unit 52, and inputting commands issued by a user via the user's operations of a group of buttons 54, and a main controller 60 for performing control of the whole apparatus. In addition, the printer unit 20, the scanner unit 30, the memory card controller 44 and the main controller 60 are configured so as to be capable of transmitting/receiving various control signals and data to/from one another via a bus 12.

The printer unit 20 is configured to include a printer ASIC 22 and a printer mechanism 24. The printer ASIC 22 is an integrated circuit for controlling the printer mechanism 24, and upon receipt of a print command from the main controller 60, the printer ASIC 22 performs control so as to cause the printer mechanism 24 to print images on the sheet of printing paper S on the basis of image data that is a target of the print command. Further, the printer mechanism 24 is configured as a color printer mechanism employing a well-known ink jet method, in which printing is performed by causing a print head to discharge respective inks having colors of cyan (C), magenta (M), yellow (Y) and black (K) onto the sheet of printing paper S.

The scanner unit 30 is configured to include a scanner ASIC 32 and a scanner mechanism 34. The scanner ASIC 32 is an integrated circuit, and upon receipt of a read command from the main controller 60, the scanner ASIC 32 performs control so as to cause the scanner mechanism 34 to read in the content of a document placed on the glass table 36 as image data. Further, the scanner mechanism 34 is configured as a well-known image scanner, and includes well-known color image sensors for separating reflected light rays, which are obtained after irradiating light rays towards a document, into respective light rays having red (R), green (G) and blue (B) colors, and converting the respective light rays into image data.

The memory card controller 44 is a device for outputting/inputting data to/from the memory card 42 being inserted in the memory card slot 40. This memory card controller 44 is configured to, while the memory card 42 is being inserted in the memory card slot 40, read out files that are stored in the memory card 42 to transmit the files to the main controller 60, and upon receipt of a command from the main controller 60, on the basis of the command, store files in the memory card 42.

The operation panel 50 is a device that is used for a user to input various commands to the printer unit 20, and includes the display unit 52, which is configured by a color liquid crystal panel, and has texts and images in accordance with various commands displayed thereon, and the operation unit 54, through which a user performs various operations. The operation unit 54 has various keys arranged thereon, such as a cursor key, which is pushed down by a user when the user desires to shift a cursor for selecting a process, a text and the like, and a decision key, which is pushed down by a user when the user makes a decision on selection of a process and the like.

The main controller 60 is configured as a micro processor functioning centered on a CPU 62, and includes an external RAM 64 for temporarily storing therein scanning data, print-ing data and the like, a flash ROM 65, which is capable of storing and erasing information, and stores therein various processing programs, various pieces of data, various tables and the like, and an internal communication interface (I/F) 69, which enables communicating with the operation panel 50. The CPU 62 includes a built-in RAM 63 as a cash memory, and this built-in RAM 63 is configured by a static RAM (SRAM). Further, the external RAM 64 is configured by a synchronous dynamic RAM (SDRAM). In this embodiment, the built-in RAM 63 has the storage capacity of 25 KB, which is less than that of the external RAM 64 (which is, for example, several hundreds MB). In addition, the built-in RAM 63 has a sufficiently high access rate (for example, more than or equal to ten times, or the like), compared with that of the external RAM 64, and the external RAM 64 has a sufficiently high access rate (for example, more than or equal to ten times, or the like), compared with that of the flash ROM 65. In the flash ROM 65, a look-up table (LUT) for pictures 66 and an LUT for texts 67, which are used for performing a color conversion of individual pixels included in image data, are stored. This main controller 60 inputs thereto various operation signals and various detection signals from the printer unit 20, the scanner unit 30 and the memory card controller 44, information related to printing paper, which indicates whether the printing paper S is dedicated printing paper or regular printing paper, from a printing paper determination sensor 55, and operation signals that are generated in accordance with a user's operations of the group of buttons 54 included in the operation panel 50. Further, the main controller 60 outputs therefrom a read-out command for instructing the memory card controller 44 to read out files from the memory card 42 to output the files to the main controller 60, a print command for instructing the printer unit 20 to execute printing of image data, a read-in command for instructing the scanner unit 30 to read in the content of a document placed on the glass table 36 on the basis of a scan command from the group of buttons 54 included in the operation panel 50, and a control command for instructing the operation panel 50 to perform control of the display unit 52.

Here, let us describe the LUT for pictures 66 and the LUT for texts 67. Both of the LUT for pictures 66 and the LUT for texts 67 are tables that enable converting individual pixels included in image data from a color space of RGB colors to a color space of CMYK colors. The LUT for pictures 66 is appropriate to performing a color conversion of picture pixels, that is, pixels, among pixels included in image data, belonging to areas each representing a picture, (for example, pixels representing images resulting from shooting an object with a digital camera, images resulting from reading in silt salt pictures by using the scanner mechanism 34, and the like), and is configured so as to be capable of performing a color conversion emphasizing, for example, a color reproduction capability. The LUT for texts 67 is appropriate to performing a color conversion of text pixels, that is, pixels, among pixels included in image data, belonging to areas each representing a text, and is configured so as to be capable of performing a color conversion emphasizing, for example, making pure colors be vivid, which are sometimes used for texts, and accentuating color differences between individual colors. In addition, in this embodiment, it is assumed that image data includes pixels that are arrayed in a matrix vertically and horizontally, and each of the arrayed pixels is represented by colors (RGB or CMYK) each having a color value represented by a value from 0 to 255, that is, one of 256 gray scales (8 bits), in accordance with a contrasting density thereof. Further, the number of grids for the LUT for pictures 66, which is stored in the flash ROM 65, is a predetermined number of storage grids for pictures Mp, and the number of grids for the LUT for texts 67, which is also stored in the flash ROM 65, is a predetermined number of storage grids for texts Mt. In this embodiment, it is assumed that each of the number of storage grids for pictures Mp and the number of storage grids for texts Mt is a value "17". In the case where each of the four colors CMYK is represented by a piece of data consisting of 8 bits (one byte), a value resulting from multiplying the third power of the number of grids by four is a storage size (unit is "byte") of the LUT, and therefore, each of the storage size of the LUT for pictures 66 and the storage size of the LUT for texts 67, which are stored in the flash ROM 65, is approximately 19.6 KB. Since the storage capacity of the built-in RAM 63 is 25 KB, only either of the LUT for pictures 66 or the LUT for texts 67 can be stored in the built-in RAM 63.

Figure 2:
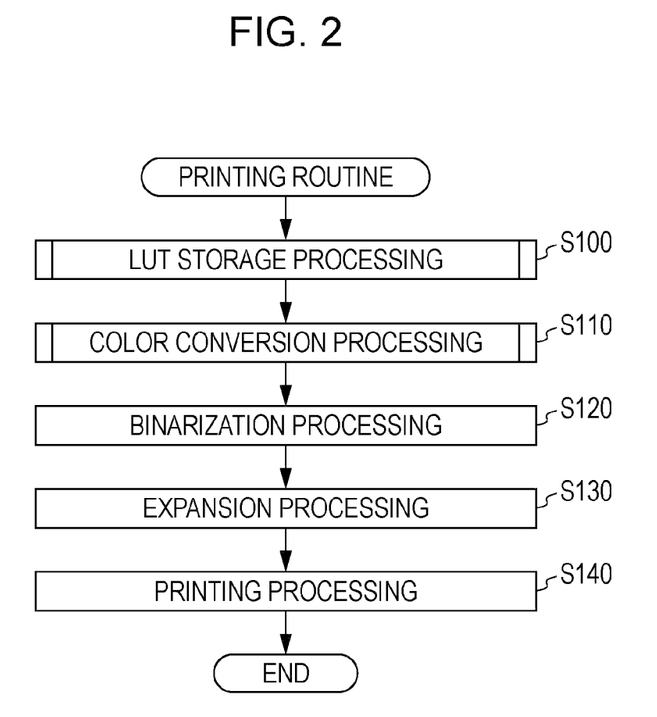
FIG. 2 is a flowchart illustrating an example of a printing routine according to an embodiment of the invention.

Next, operations of the printer 10 according to this embodiment, which is configured in such a manner as described above, will be hereinafter described. FIG. 2 is a flowchart illustrating an example of a printing routine executed by the CPU 62 of the main controller 60. This printing routine is executed when a user operates the operation unit 54 to select image data (for example, image data stored in the memory card 42), which is a target for printing, and consists of pixels included in a color space of RGB colors, and issues a printing start command.

Upon start of this printing routine, firstly, the CPU 62 reads out the LUT for pictures 66 and LUT for texts 67, which are stored in the flash ROM 65, to perform LUT storage processing for storing the LUT for pictures 66 and the LUT for texts 67 having been read out in the built-in RAM 63 and the external RAM 64, or in the external RAM 64 and the built-in RAM 62, respectively (step S100), and performs color conversion processing, in which, for each of the pixels included in the image data having been selected by the user, by using one of the LUTs, which is stored in the built-in RAM 63 or the external RAM 64, a color space conversion from a color space of RGB colors, each being represented by 8 bits, into a color space of CMYK colors, each being represented by 8 bits, is performed (step S110). Subsequently, by using, for example, the dither method, the CPU 62 performs binarizing processing for converting the obtained image data including pixels of the color space of CMYK colors into binarized data including pixels of a color space of CMYK colors, each being represented by 2 bits (step S120), and performs expansion processing on the binarized data in an order, in which a print head of the printer mechanism 24 forms dots, to create print data that is a target for printing (step S130). Further, the CPU 62 outputs the created print data to the printer unit 20 together with a print command, upon receipt of the print command, the printer ASIC 22 performs control so as to cause the printer mechanism 24 to print images on sheets of the printing paper S on the basis of the print data (step S140), and then, terminates this routine. Hereinafter, the LUT storage processing in step S100 and the color conversion processing in step S110 will be sequentially described.

Figure 3:
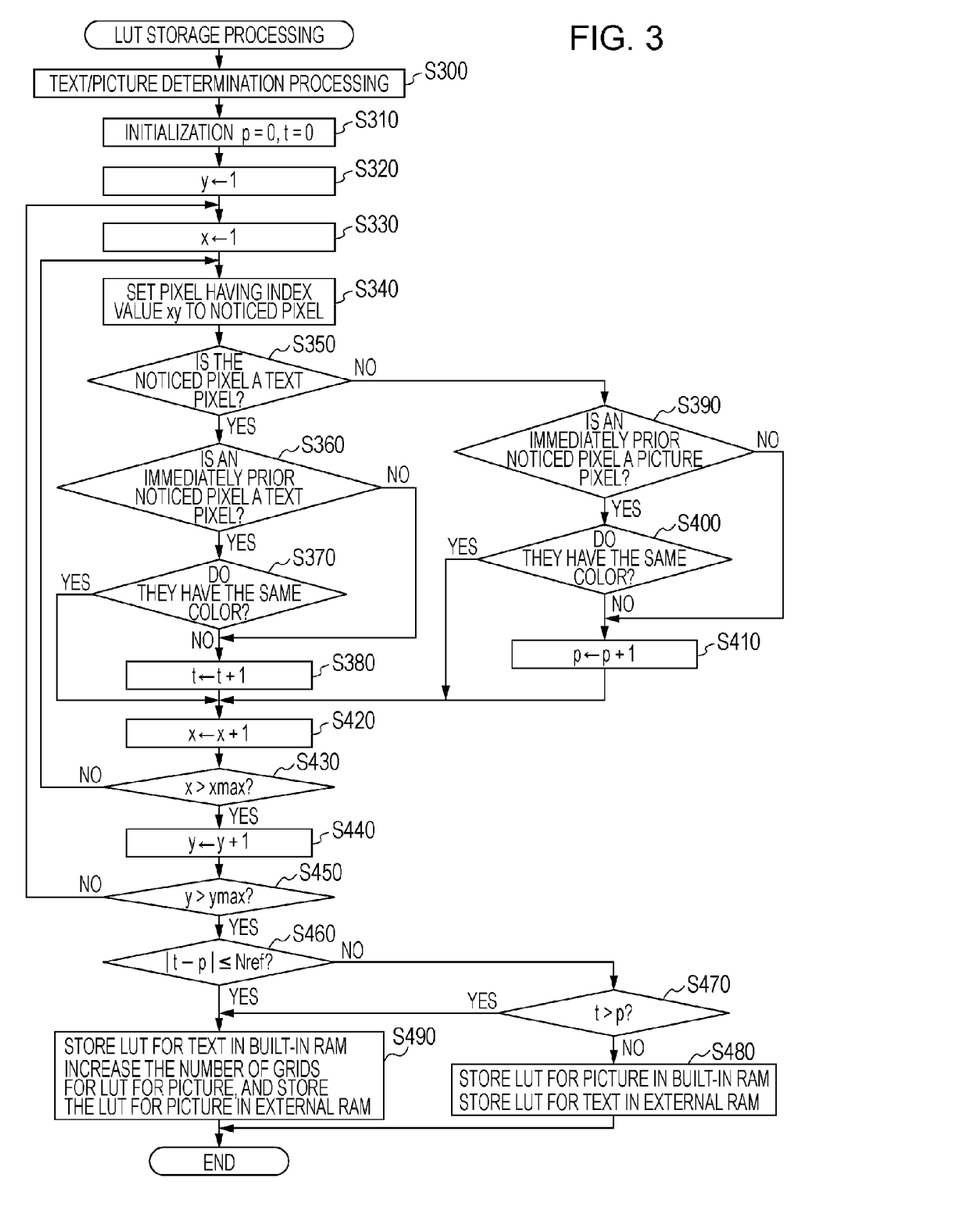
FIG. 3 is a flowchart illustrating an example of LUT storage processing according to an embodiment of the invention.

Firstly, the LUT storage processing in step S100 will be hereinafter described. FIG. 3 is a flowchart illustrating an example of the LUT storage processing. In this LUT storage processing, firstly, for image data having been selected by a user, the CPU 62 performs text/picture determination processing for determining whether individual pixels of the image data are picture pixels or text pixels (step S300). This determination is made so that, for example, for the image data, text areas are specified by performing an edge-area detection, a halftone-dot-area detection, a white-background-area detection and a chromatic/achromatic color area detection, and pixels included in the text areas and pixels included in areas other than the text areas are determined to be the text pixels and the picture pixels, respectively. Such a method for specifying the text areas are described in, for example, JP-A-2004-187119, Japanese Patent No. 3,153,221 and JP-A-5-48892.

Subsequently, the CPU 62 initializes each of a value of a picture pixel counter p and a value of a text pixel counter t to a value "0" (step S310). Further, the CPU 62 sets an index value y to a value "1" (step S320), as well as an index value x to a value "1" (step S330), and assigns a pixel corresponding to the index values x and y having been set as a noticed pixel (step S340). Here, the index values x and y are used as values indicating position coordinates of respective pixels arrayed in a matrix in image data, and it is assumed that each of the index values x and y corresponding to a pixel located at the most upper-left position of image data is a value "1", and an axis extending in a right direction therefrom and an axis extending in a downward direction therefrom are determined to be an x-axis direction and a y-axis direction, respectively. Next, it is determined whether a pixel having been set as the noticed pixel is a text pixel or not (step S350). This determination is made on the basis of a result of the text/picture determination processing performed in step S300.

Further, if the current noticed pixel is a text pixel, the CPU 62 makes a positive determination in step S350, and determines whether a noticed pixel immediately prior to the current noticed pixel was a text pixel, or not (step S360). Here, in the LUT storage processing, the noticed pixel is shifted in the x-axis direction from a pixel at the most upper-left position on a pixel-by-pixel basis, and when having reached a pixel at the most upper-right position, processing is performed so that the noticed pixel is shifted in the y-axis direction by one pixel, and is shifted in the x-axis direction from a pixel at the leftmost position to a pixel at the rightmost position, and by iterating such a processing, each of pixels starting from a pixel at the most upper-left position to a pixel at the most lower-right position is sequentially assigned as the notice pixel. This order for assigning the noticed pixel is the same order as that for assigning a noticed pixel in the color conversion processing, which will be described below. Therefore, for example, if a current noticed pixel is a pixel at the position where x=3, y=4, in step S360, the CPU 62 determines whether a pixel at the position where x=2, y=4, which is a pixel immediately prior to the current pixel, was a text pixel, or not. In addition, if a current noticed pixel is a pixel at the position where x=1, y=1, since no pixel immediately prior to the current pixel exists, the CPU 62 makes a negative determination in step S360.

If the CPU makes a positive determination in step S360, the CPU 62 determines whether the immediately prior noticed pixel and the current noticed pixel have the same color, or not (step S370). In addition, having the same color means that the current noticed pixel and the immediately prior noticed pixel have the same gray scale value of RGB. Further, if the CPU 62 makes a negative determination in step S360 or in step S370, the CPU 62 increments the text pixel counter t by a value "1" (step S380).

Meanwhile, if the current noticed pixel is a picture pixel, the CPU 62 makes a negative determination in step S350, and determines whether a noticed pixel immediately prior to the current pixel was a picture pixel, or not (step S390). If, in step S390, the CPU 62 makes a positive determination, the CPU 62 determines whether the immediately prior pixel and the current pixel have the same color, or not (step S400). Further, if, in step S390 or in step S400, the CPU makes a negative determination, the CPU 62 increments the picture pixel counter p by a value "1" (step S410).

If the CPU 62 makes a positive determination in step S370 or in step S400, or the CPU 62 performs processing in step S380 or in step S410, the CPU 62 increments the index value x by a value "1" (step S420), and determines whether the incremented index value x is more than a maximum value xmax, or not (step S430). In addition, the maximum value xmax is an index value x of a pixel at the rightmost position in the image data having been selected by the user. If the CPU 62 makes a negative determination in step S430, the CPU 62 returns the process flow to step S340 and iterates the following processes. In contrast, if the CPU 62 makes a positive determination in step S430, the CPU 62 increments the index value y by a value "1" (step S440), and determines whether the incremented index value y is more than a maximum value ymax, or not (step S450). In addition, the maximum value ymax is an index value y of a pixel at the lowest position in the image data having been selected by the user. If the CPU 62 makes a negative determination in step S450, the CPU 62 returns the process flow to step S330, and iterates the following processes. Further, after the CPU 62 has assigned all pixels as noticed pixels, that is, after the CPU 62 has assigned a pixel at the most lower-right position as the notice pixel, the CPU 62 makes a positive determination in step S450.

Here, let us describe a value of the text pixel counter t and a value of the picture pixel counter p that are obtained after having performed processes in steps S300 to S450, until, in step S450, the positive determination has been made. During processes performed in steps S300 to S450, basically, if a noticed pixel is a text pixel, the text pixel counter t is incremented by a value "1", and if a noticed pixel is a picture pixel, the picture pixel counter p is incremented by a value "1". In this regard, however, if a current noticed pixel and a noticed pixel immediately prior to the current pixel are the same kind of pixels, and further, represent the same color (hereinafter, such a current noticed pixel will be denoted by a successive pixel), the text pixel counter t and the picture pixel counter p are not incremented. In such a manner, as a result, the text pixel counter t has a value resulting from subtracting the number of successive pixels associated with the text pixel from the number of text pixels included in the image data, and the picture pixel counter p has a value resulting from subtracting the number of successive pixels associated with the picture pixel from the number of picture pixels included in the image data. Although details will be described below, in the color conversion processing, since text pixels are color converted by using the LUT for texts 67, and picture pixels are color converted by using the LUT for pictures 66, basically, a total number of the text pixels included in image data results in a total number of references to the LUT for texts 67, and a total number of the picture pixels included in image data results in a total number of references to the LUT for pictures 66. In this regard, however, when sequentially performing a color conversion of individual pixels included in image data, since, for each of the successive pixels, a result of performing a color conversion of the successive pixel is the same as that of a noticed pixel immediately prior to the successive pixel, for the successive pixel, it is unnecessary to reference the LUT. For this reason, in processes in steps S300 to S450, the text pixel counter t has a value resulting from subtracting the number of successive pixels associated with the text pixel from the number of text pixels included in image data, and the picture pixel counter p has a value resulting from subtracting the number of successive pixels associated with the picture pixel from the number of picture pixels included in image data. In such a manner, as a result, the value of the text pixel counter t is a predicted total number of references to the LUT for texts 67 in the color conversion processing described below, and the value of the picture pixel counter p is a predicted total number of references to the LUT for pictures 66 in the color conversion processing described below.

Further, if the CPU 62 makes a positive determination in step S450, the CPU 62 determines whether the absolute value of a difference between the value of the picture pixel counter p and the value of the text pixel counter t is less than or equal to a threshold value Nref, or not (step S460). Here, the threshold value Nref is determined as a value that enables the value of the picture pixel counter p and the value of the text pixel counter t to be considered to be nearly equal (for example, a value equal to several percent of the number of pixels included in image data, and the like). If, the CPU 62 makes a negative determination in step S460, the CPU 62 determines whether the value of the text pixel counter t is larger than the value of the picture pixel counter p, or not (step S470). Further, if the CPU makes a negative determination, the CPU 62 reads out the LUT for pictures 66 from the flash ROM 65 to store the read-out LUT for pictures 66 in the built-in RAM 63, along therewith, reads out the LUT for texts 67 from the flash ROM 65 to store the read-out LUT for texts 67 in the external RAM 64 (step S480), and then, terminates the LUT storage processing. If the value of the text pixel counter p is larger than the value of the picture pixel counter t, since it is predicted that, in the color conversion processing, a total number of references to the LUT for pictures 66 is more than a total number of references to the LUT for texts 67, the LUT for pictures 66 is stored in the built-in RAM 63 having a high access rate, and the LUT for texts 67 is stored in the external RAM 64.

Meanwhile, if the CPU 62 makes a positive determination in step S460 or in step S470, the CPU 62 reads out the LUT for texts 67 from the flash ROM 65 to store the read-out LUT for texts 67 in the built-in RAM 63, and further, reads out the LUT for pictures 66 from the flash ROM 65, increases the number of grids for the read-out LUT for pictures 66 from the number of memory grids for pictures Mp to the number of storage grids for pictures Np, stores the resultant LUT for pictures 66 in the external RAM 64 (step S490), and then, terminates the LUT storage processing. If, in step S470, the CPU 62 makes a positive determination, that is, if the value of the text pixel counter t is more than the value of the picture pixel counter p, since it is predicted that, in the color conversion processing, a total number of references to the LUT for texts 67 is more than a total number of references to the LUT for pictures 66, the LUT for texts 67 is stored in the built-in RAM 63 having a high access rate, and the LUT for pictures 66 is stored in the external RAM 64. In this case, after having increased the number of grids for the LUT for pictures 66, the LUT for pictures 66 is stored in the external RAM 64, and thus, it is possible to perform a color conversion of picture pixels with high quality. Further, if, in step S460, a positive determination is made, in the color conversion processing, the number of references to the LUT for texts 67 and the number of references to the LUT for pictures 66 are nearly equal, and thus, no matter which of the LUTs is stored in the built-in RAM 63, processing rates are not so different. Therefore, in this case as well, the LUT for texts 67 is stored in the built-in RAM 63, and by increasing the number of grids for the LUT for pictures 66, it is made possible to perform a color conversion of picture pixels with high quality. In addition, in this embodiment, it is assumed that the number of storage grids for pictures Np is equal to a value "32", and the external RAM 64 secures therein at least a free space, in which the LUT for pictures 66, which includes grids whose number is equal to the number of storage grids for pictures Np, can be stored.

Figure 4:
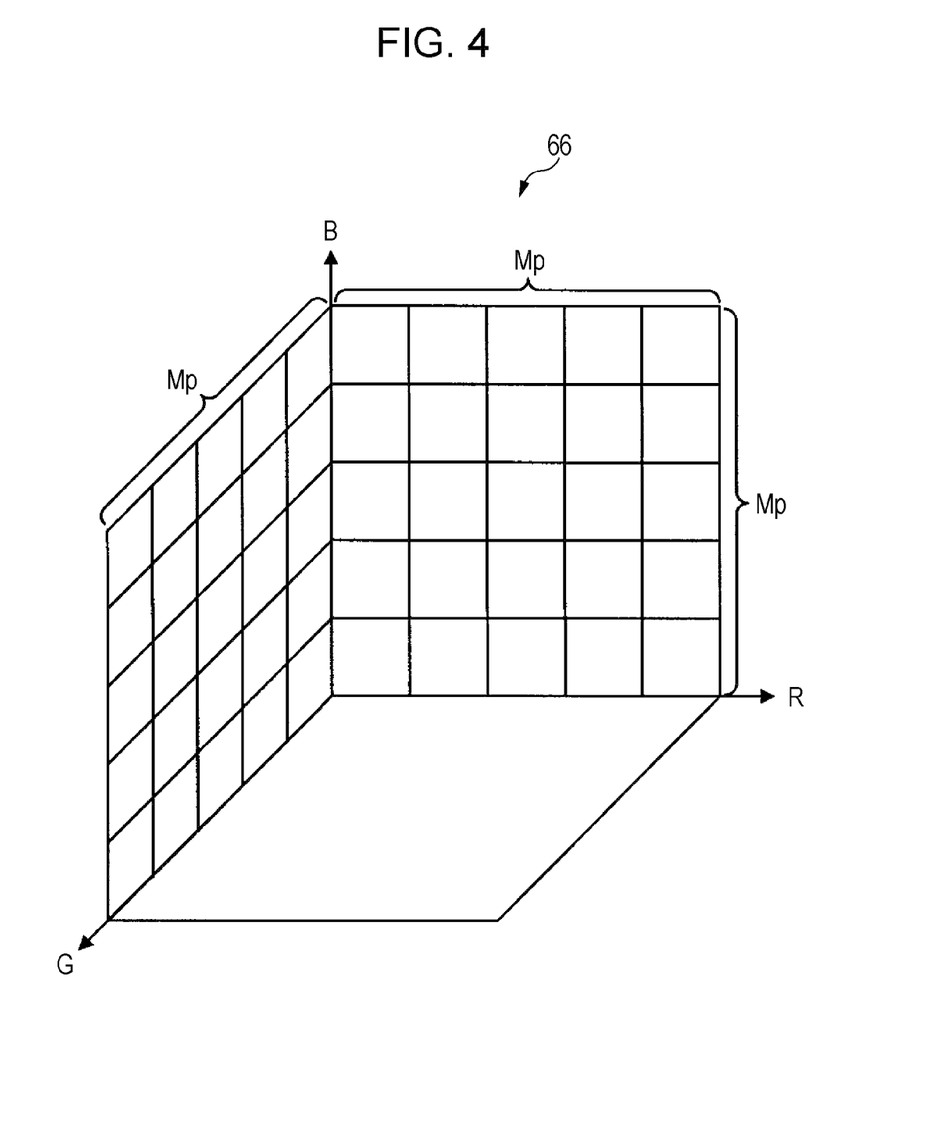
FIG. 4 is an explanation diagram illustrating an LUT for pictures stored in a flash ROM, according to an embodiment of the invention.
Figure 5:
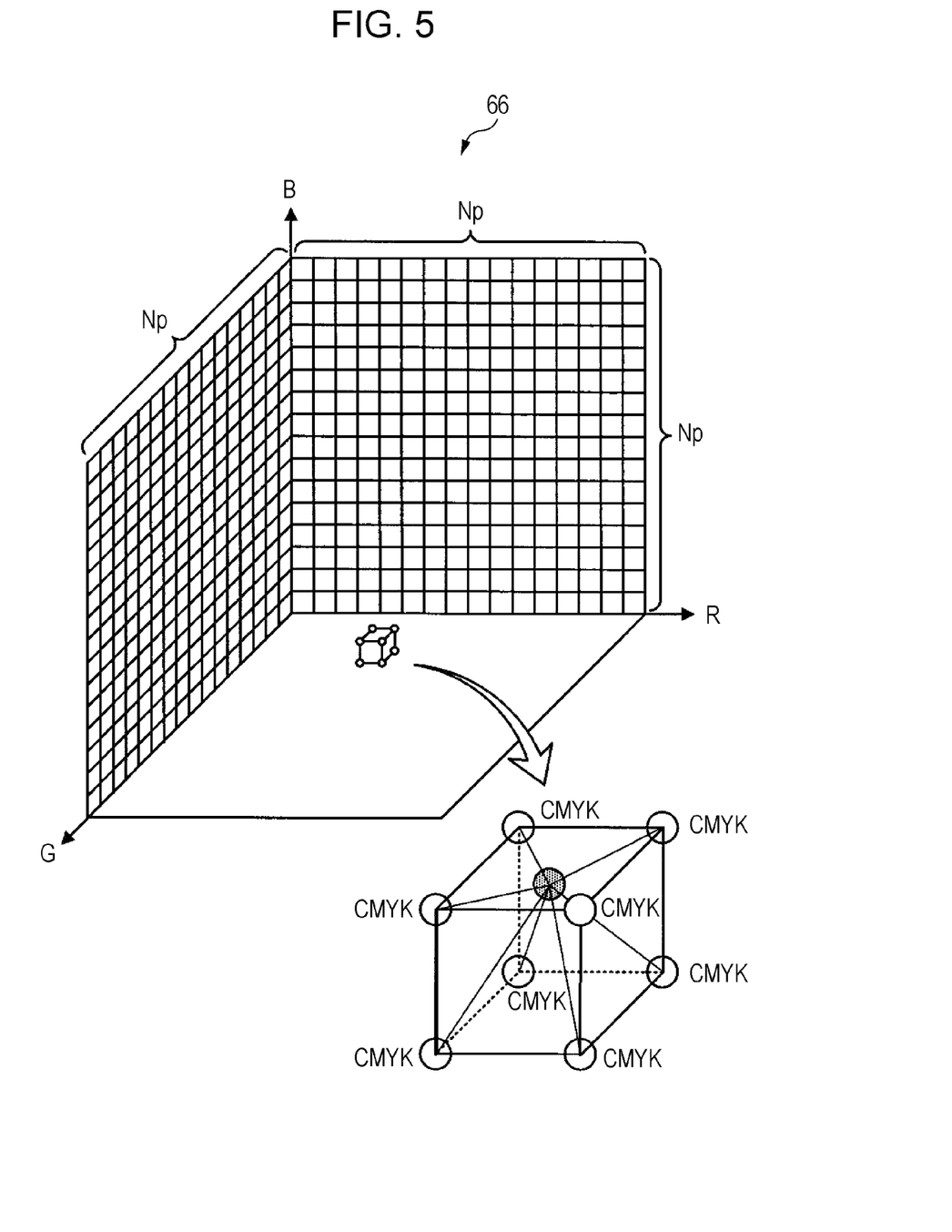
FIG. 5 is an explanation diagram illustrating an LUT for pictures, which is obtained after changing a total number of grids thereof, according to an embodiment of the invention.

Here, processing for increasing the number of grids for the LUT for pictures 66 from the number of memory grids for pictures Mp to the number of storage grids for pictures Np, which is performed in step S490, will be described below. FIG. 4 is an explanation diagram illustrating the LUT for pictures 66 stored in the flash ROM 65. As shown in FIG. 4, the LUT for pictures 66 has lattice point data obtained by dividing each of an R-axis, a G-axis and a B-axis constituting a three-dimensional RGB space by the number of memory grids for pictures Mp. In addition, in FIG. 4, taking into account viewability, the LUT for pictures 66 is illustrated so that the number of grids therefor is reduced to a number less than an actual number. The lattice point data is caused to correspond to CMYK values corresponding to respective RGB values, and thus, it is possible to convert RGB values associated with respective pixels included in image data into corresponding CMYK values. It is possible to, for the LUT for pictures 66 shown in FIG. 4, increase an amount of lattice point data (i.e., increase the number of grids) by interpolating data between lattice points by using well-known tetrahedral interpolation processing. In FIG. 5, an explanation diagram illustrating the LUT for pictures 66 resulting from increasing the number of grids therefor from the number of memory grids for pictures Mp to the number of storage grids for pictures Np is provided. In addition, in FIG. 5 as well, taking into account viewability, the LUT for pictures 66 is represented so that the number of grids therefor is reduced to a number less than an actual number.

In addition, in step S480, as is different from processing performed in step S490, the number of grids for the LUT for texts 67, which is to be stored in the external RAM 64, is not increased. This is because, for text pixels, it is possible to, by using the LUT for texts 67 having grids whose number is a value "17", perform a color conversion with sufficiently high quality.

Figure 6:
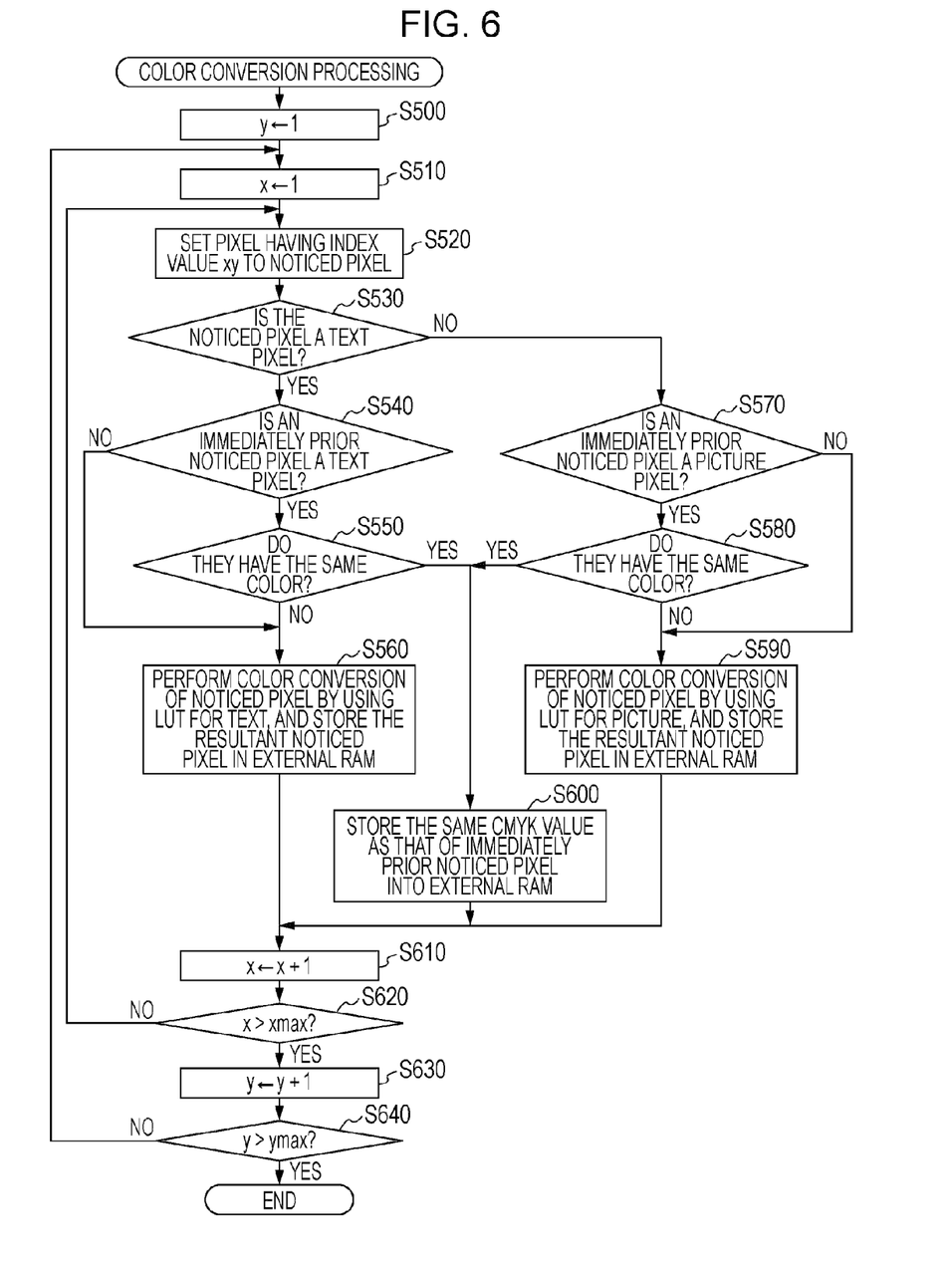
FIG. 6 is a flowchart illustrating an example of color conversion processing according to an embodiment of the invention.

Next, color conversion processing performed in step S110 will be hereinafter described. FIG. 6 is a flowchart illustrating an example of color conversion processing. In this color conversion processing, firstly, the CPU 62 sets the index value y to a value "1" (step S500), as well as the index value x to a value "1" (step S510), and sets a pixel corresponding to the index values x and y having been set to a noticed pixel (step S520). In addition, the index values x and y are the same as those in the above-described LUT conversion processing. Next, the CPU 62 determines whether the noticed pixel having been set is a text pixel or not (step S530). This determination is made on the basis of a result of the text/picture determination processing performed in step S300 of the LUT storage processing.

Further, if the current noticed pixel is a text pixel, the CPU 62 makes a positive determination in step S530, and determines whether a noticed pixel immediately prior to the current noticed pixel was a text pixel, or not (step S540). This processing is performed in the same manner as that in step S360 of the LUT storage processing.

If the CPU 62 makes a positive determination in step S540, the CPU 62 determines whether the immediately prior pixel and the current pixel have the same color, or not (step S550). Further, if the CPU 62 makes a negative determination in step S540 or in step S550, by using the LUT for texts 67, the CPU 62 performs a conversion of the noticed pixel from a color space of RGB colors to a color space of CMYK colors, and stores the resultant noticed pixel in the external RAM 64 (step S560). In addition, in this processing, the color conversion is performed by using the LUT for texts 67 having been stored in the built-in RAM 63 or in the external RAM 64 in step S480 or in step S490 of the LUT storage processing. In addition, it is assumed that, when performing a color conversion of a pixel by using an LUT, as shown in FIG. 5, if the position of an RGB value (a sphere with hatching lines) of a pixel does not correspond to any positions of respective pieces of lattice point data (white spheres), a CMYK value corresponding to the RGB value of the pixel is calculated on the basis of respective distances from the position of the RGB value of the pixel to the positions of lattice points that are located at respective apexes of a lattice of a minimum size, in which the RGB value of the pixel is stored.

Meanwhile, if the current pixel is a picture pixel, the CPU 62 makes a negative determination in step S530, and determines whether a noticed pixel immediately prior to the current pixel was a picture pixel, or not (step S570). If, the CPU 62 makes a positive determination in step S570, the CPU 62 determines whether the immediately prior pixel and the current pixel have the same color, or not (step S580). Further, if, in step S570 or in step S580, the CPU 62 makes a negative determination, the CPU 62 performs a color conversion of the noticed pixel from a color space of RGB colors to a color space of CMYK colors by using the LUT for pictures 67, and stores the resultant noticed pixel in the external RAM 64 (step S590). In addition, in this processing, the color conversion is performed by using the LUT for pictures 66 having been stored in the built-in RAM 63 or in the external RAM 64 in step S480 or in step S490 of the LUT storage processing. In addition, just like in step S560, in step S590 as well, when performing a color conversion of a pixel by using an LUT, if the position of an RGB value of the pixel does not correspond to any positions of respective pieces of lattice point data, a CMYK value corresponding to the RGB value of the pixel is calculated on the basis of respective distances from the position of the RGB value of the pixel to the positions of lattice points that are located at respective apexes of a lattice of a minimum size, in which the RGB value of the pixel is stored.

Further, if, in step S550 or in step S580, the CPU 62 determines a positive determination, since the current noticed pixel is a successive pixel, the CPU 62 stores a CMYK value, which is the same as that having been obtained by performing a color conversion of the immediately prior pixel, in the external RAM 64 as a CMYK value to be obtained by performing a color conversion of the current pixel (in step S600). If a current pixel is a successive pixel, by storing a CMYK value obtained after having performed a color conversion of an immediately prior noticed pixel as a CMYK value to be obtained by performing a color conversion of the current pixel, it is intended to shorten processing time by reducing the number of references to the LUT.

Further, after having performed processing in step S560, step S590 or S600, the CPU 62 increments the index value x by a vale "1" (step S610), and determines whether the incremented index value x is more than the maximum value xmax, or not (step S620). If the CPU 62 determines a negative determination in step S620, the CPU 62 returns the process flow to step S520, and iterates the following processes. In contrast, if the CPU 62 determines a positive determination in step S620, the CPU 62 increments the index value y by a vale "1" (step S630), and determines whether the incremented index vale y is more than the maximum value ymax, or not (step S640). If the CPU 62 determines a negative determination in step S640, the CPU 62 returns the process flow to step S510, and iterates the following processes. If the CPU 62 determines a positive determination in step S640, the CPU 62 judges that color conversions of all the respective pixels included in the image data have been completed, and terminates the color conversion processing.

Here, respective correspondence relations between configuration elements of this embodiment and configuration elements of the invention are made obvious. The flash ROM 65 according to this embodiment corresponds to a first storage section according to the invention; the built-in RAM 63 corresponds to a second storage section; the CPU 62, which executes processes in steps S300 to S450 of the LUT storage processing shown in FIG. 3, corresponds to a total-number-of-references prediction section; the CPU 62, which executes processes in steps S460 and S470, corresponds to an LUT-to-be-stored determination section; the CPU 62, which executes processes in steps S480 and S490, corresponds to a storage section; and the external RAM 64 corresponds to a third storage section.

The printer 10 according to this embodiment, which has been described above in detail, is configured to, for image data including a plurality of pixels and being a target for a color conversion, derive a value of the picture pixel counter p, which indicates a predicted total number of reference to the LUT for pictures 66, and a value of the text pixel counter t, which indicates a predicted total number of references to the LUT for texts 67, and determine the LUT for pictures 66 or the LUT for texts 67, whichever has a more predicted total number of references, as an LUT to be stored in the built-in RAM 63. Further, one of the LUT for pictures 66 and the LUT for texts 67, which has been determined to be stored in the built-in RAM 63, is read out from the flash ROM 65 to be stored in the built-in RAM 63, and further, the other one of the LUTs is read out from the flash ROM 65 to be stored in the external RAM 64. In such a manner, the LUT for pictures 66 or the LUT for texts 67, whichever has a more predicted total number of references, is stored in the built-in RAM 63 having an access rate higher than that of the flash ROM 65. For this reason, in the case where only one of the LUTs used for color conversions can be stored in the built-in RAM 63 having a high access rate, it is possible to, by appropriately determining whichever of the LUTs is to be stored in the built-in RAM 63, shorten processing time for the whole of the color conversions. Furthermore, the other one of the LUTs, which is not to be stored in the built-in RAM 63, is also stored in the external RAM 64 having an access rate higher than that of the flash ROM 65, and thus, it is possible to shorten the whole processing time necessary for performing a color conversion of image data.

Further, the printer 10 according to this embodiment is configured to perform the text/picture determination processing for, for each of pixels included in image data, determining to which kind of pixels of the picture pixel and the text pixel the pixel belongs, perform processing for sequentially assigning each pixel as a noticed pixel in an order the same as that of color conversions of the pixels, which are performed in a color conversion of the image data, and determining that the noticed pixel is a successive pixel if the noticed pixel and a pixel immediately prior to the noticed pixel are the same kind of pixels, and further, represent the same color, deriver a value as a predicted total number of references to the LUT for pictures 66, the value being obtained by subtracting the number of the successive pixels associated with the picture pixel from the number of pixels each having been determined to be the picture pixel, and deriver a value as a predicted total number of references to the LUT for texts 67, the value being obtained by subtracting the number of the successive pixels associated with the text pixel from the number of the text pixels each having been determined to be the text pixel, and thus, it is possible to appropriately derive the predicted total numbers of references.

Further, the printer 10 according to this embodiment is configured to, when, in the LUT storage processing, storing the LUT for texts 67 in the built-in RAM 63, increase the number of grids for the LUT for pictures 66 having been read out from the flash ROM 65 to an extent which does not exceed the size of a space area of the external RAM 64, and store the resultant LUT for pictures 66 in the external RAM 64, and thus, it is possible to perform a color conversion of picture pixels with high quality in the case where the LUT for pictures 67 is stored in the external RAM 64. Furthermore, the printer 10 according to this embodiment is configured to, if the absolute value of a difference between a predicted total number of references to the LUT for pictures 66 and a predicted total number of references to the LUT for texts 67 is less than or equal to the predetermined threshold value Nref, which enables both of the predicted total numbers of references to be considered to be nearly equal to each other, store the LUT for texts 67 in the built-in RAM 63, and further, store the LUT for pictures 66, resulting from increasing the number of grids for the read-out LUT for pictures 66, in the external RAM 64, and thus, it is possible to perform color conversions of picture pixels with high quality in the case where both of the predicted total numbers of references can be considered to be nearly equal to each other.

In addition, the invention is not limited to the above-described embodiment, but, obviously, the invention can be practiced in various forms as far as they belong to the technical scope of the invention.

For example, in the above-described embodiment, the number of storage grids for pictures Np is assumed to be a value "32", but may be a different value if the value does not cause the storage size of the LUT for pictures 66 to be more than a space capacity of the external RAM 64. Further, the number of storage grids for pictures Np may not be a predetermined value, but, for example, may be derived each time in accordance with a space capacity of the external RAM 64. In this case, an upper limit value for the number of grids for the LUT for pictures 66 may be determined in advance, and a maximum number of grids, which is included within a scope limited by the upper limit value, and further, is included within a scope not causing the storage size of the LUT for pictures 66 to be more than the space capacity of the external RAM 64, may be derived as the number of storage grids for pictures Np. In addition, the upper limit value for the number of grids may be determined to be, for example, the number of grids, which causes any increased numbers of grids more than the current number of grids not to change the quality of colors resulting from color conversions so much from human view. In such a manner, processing is performed so that the number of grids is derived every time the LUT for pictures 66 is stored in the external RAM 64, so that it is possible to appropriately increase the number of grids of the LUT for pictures 66 in accordance with a space capacity of the external RAM 64, and store the resultant LUT for pictures 66 in the external RAM 64.

In the above-described embodiment, in the LUT storage processing, a value resulting from subtracting the number of the successive pixels associated with the picture pixel from the number of pixels each having been determined to be the picture pixel is derived as a predicted total number of references to the LUT for pictures 66, and further, a value resulting from subtracting the number of the successive pixels associated with the text pixel from the number of pixels each having been determined to be the text pixel is derived as a total number of references to the LUT for texts 67, but, merely, the number of picture pixels included in image data may be handled as the predicted total number of references to the LUT for pictures 66, and the number of text pixels included in image data may be handled as the predicted total number of references to the LUT for texts 67.

In the above-described embodiment, subsequent to the positive determination in step S460, the process in step S490 is performed, but the determination in step S460 may be skipped. In this case, processing may be performed so that, subsequent to the positive determination in step S450, the process in step S470 is performed.

In the above-described embodiment, in respective steps S480 and S490, one LUT of the LUT for pictures 66 and the LUT for texts 67 is stored in the built-in RAM 63, and the other LUT thereof is stored in the external RAM 64, but the other LUT thereof may not be stored in the external RAM 64. In this case, when, in the color conversion processing, performing a color conversion using the other LUT thereof, the other LUT thereof stored in the flash ROM 65 may be used. In this regard, however, it is desirable to store the other LUT thereof in the external RAM 64 because the external RAM 64 has an access rate higher than that of the flash ROM 65.

In the above-described embodiment, in step S490, the number of grids for the LUT for pictures 66 is increased from the number of memory grids for pictures Mp to the number of storage grids for pictures Np, but the number of grids for the LUT for pictures 66 may not be increased. That is, the LUT for pictures 66, which has the number of memory grids for pictures Mp as it is, may be stored in the external RAM 64.

What is claimed is:

1. An image processing apparatus comprising:
   a first storage section configured to, as look-up tables (LUTs) for being referenced when performing a color conversion from a first color space to a second color space, store an LUT for pictures, which is appropriate to performing the color conversion of a picture pixel that is a pixel included in an area representing a picture, and an LUT for texts, which is appropriate to performing the color conversion of a text pixel that is a pixel included in an area representing a text;
   a second storage section configured to have a storage capacity that is larger than each of a storage size of the LUT for pictures and a storage size of the LUT for texts, and further, is smaller than a storage size resulting from summing the storage size of the LUT for pictures and the storage size of the LUT for texts, and have an access rate higher than an access rate of the first storage section;
   a total-number-of-references prediction section configured to, for image data including a plurality of pixels and being a target for the color conversion, derive a predicted total number of references to the LUT for pictures and a predicted total number of references to the LUT for texts when performing the color conversion of the image data;
   an LUT-to-be-stored determination section configured to determine the LUT for pictures or the LUT for texts, whichever has a larger total number of references, as an LUT to be stored in the second storage section; and
   a storage section configured to, from the first storage section, read out the LUT, that is, either of the LUT for pictures or the LUT for texts, which has been determined by the LUT-to-be-stored determination section, and store the read-out LUT in the second storage section.

2. The image processing apparatus according to claim 1, wherein the total-number-of-references prediction section is a section configured to, for each of the pixels included in the image data, determine to which pixel kind of the picture pixel or the text pixel the pixel belongs, derive a predicted total number of references to the LUT for pictures on the basis of a total number of picture pixels, that is, a total number of pixels each having been determined to be the picture pixel, and further, derive a predicted total number of references to the LUT for texts on the basis of a total number of text pixels, that is, a total number of pixels each having been determined to be the text pixel.

3. The image processing apparatus according to claim 2, wherein the total-number-of-references prediction section is a section configured to sequentially assign each of the pixels as a noticed pixel in the same order as an order of the color conversion of each of the pixels performed when the color conversion of the image data is performed, determine that the noticed pixel is a successive pixel if the noticed pixel and a pixel immediately prior to the noticed pixel belong to the same kind of pixels, and further, represent the same color, derive a first value as a predicted total number of references to the LUT for pictures, the first value being obtained by subtracting a total number of the successive pixels associated with pixels that have been determined to be the picture pixels from the total number of picture pixels, and derive a second value as a predicted total number of references to the LUT for texts, the second value being obtained by subtracting a total number of the successive pixels associated with pixels that have been determined to be the text pixels from the total number of text pixels.

4. The image processing apparatus according to claim 1, further comprising:
   a third storage section configured to have a storage capacity that is larger than each of a storage size of the LUT for pictures and a storage size of the LUT for texts, and have an access rate that is higher than an access rate of the first storage section, and further, is lower than an access rate of the second storage section,
   wherein the storage section is a section configured to, from the first storage section, read out one LUT of the LUT for pictures and the LUT for texts, which has been determined by the LUT-to-be-stored determination section, to store the one LUT in the second storage section, and further, from the first storage section, read out the other LUT of the LUT for pictures and the LUT for texts to store the other LUT in the third storage section.

5. The image processing apparatus according to claim 1, wherein the storage section is a section configured to, when the LUT-to-be-stored determination section determines that the LUT for texts is to be stored in the second storage section, store the LUT for pictures obtained after increasing a total number of grids of the LUT for pictures having been read out from the first storage section so that a storage size of the LUT for pictures to be stored can be within a range not exceeding a size of a space area of the third storage section.

6. The image processing apparatus according to claim 5, wherein the LUT-to-be-stored determination section is a section configured to, in stead of determining the LUT for pictures or the LUT for texts, whichever has a larger one of the predicted total numbers of references, as an LUT to be stored in the second storage section, determine the LUT for texts as an LUT to be stored in the second storage section if a difference between the predicted total number of references to the LUT for pictures and the predicted total number of references to the LUT for texts is within a range between predetermined threshold values, which allows both thereof to be considered to be nearly equal to each other, and determine the LUT for pictures or the LUT for texts, whichever has a larger one of the predicted total numbers of references, as an LUT to be stored in the second storage section if the difference therebetween is not within the range between the predetermined values.

7. A non-transitory recording medium having a program recorded thereon for causing a computer to function as the image processing apparatus set forth in claim 1.

* * * * *